United States Patent
Snyder et al.

(10) Patent No.: US 8,905,640 B2
(45) Date of Patent: Dec. 9, 2014

(54) THRUST RING FOR UNDERCARRIAGE IN A TRACK-TYPE MACHINE

(75) Inventors: Anthony R. Snyder, Canton, IL (US); John M. Plouzek, Peoria, IL (US)

(73) Assignee: Caterpillar, Inc., Peoria, IL (US)

( * ) Notice: Subject to any disclaimer, the term of this patent is extended or adjusted under 35 U.S.C. 154(b) by 517 days.

(21) Appl. No.: 13/166,859

(22) Filed: Jun. 23, 2011

(65) Prior Publication Data

US 2012/0002910 A1    Jan. 5, 2012

Related U.S. Application Data

(60) Provisional application No. 61/361,095, filed on Jul. 2, 2010.

(51) Int. Cl.
*F16C 33/10* (2006.01)
*B21D 53/20* (2006.01)
*F16C 17/04* (2006.01)

(52) U.S. Cl.
CPC ............... *F16C 17/04* (2013.01); *B21D 53/20* (2013.01); *F16C 33/107* (2013.01)
USPC ........................................................ 384/420

(58) Field of Classification Search
USPC .................... 384/322, 368, 369, 371, 420
See application file for complete search history.

(56) References Cited

U.S. PATENT DOCUMENTS

| | | | |
|---|---|---|---|
| 4,422,650 A | 12/1983 | Reinsma et al. | |
| 4,426,091 A | 1/1984 | Baylor | |
| 5,064,298 A * | 11/1991 | Hibi et al. | 384/625 |
| 5,127,661 A | 7/1992 | Franson et al. | |
| 5,602,945 A * | 2/1997 | Davis | 384/368 |
| 5,685,548 A | 11/1997 | Casemir et al. | |
| 5,878,495 A | 3/1999 | Martens et al. | |
| 6,270,173 B1 | 8/2001 | Hashimoto et al. | |
| 6,457,304 B1 | 10/2002 | Bedford et al. | |
| 6,886,323 B2 | 5/2005 | Yamamoto | |
| 2003/0035603 A1 | 2/2003 | Kaiser | |
| 2004/0105601 A1* | 6/2004 | Honda et al. | 384/368 |
| 2008/0019625 A1 | 1/2008 | Gaumer | |

FOREIGN PATENT DOCUMENTS

JP     11170397     6/1999

* cited by examiner

*Primary Examiner* — Richard W Ridley
*Assistant Examiner* — Richard Urbanski
(74) *Attorney, Agent, or Firm* — Baker Hostetler

(57) ABSTRACT

A thrust ring for an undercarriage in a track-type machine includes an annular body having an outer circular edge and an inner circular edge defining a common center axis. A first set of oil grooves and a first set of thrust faces are positioned in an alternating arrangement on each of a first axial side and a second axial side of the annular body. Each of the oil grooves includes a cross sectional contour shaped to balance an oil flow property of the thrust ring with a strength property of the thrust ring, and defining a non-uniform curve which includes a plurality of curve segments each having a different radial attribute. The thrust ring defines a Plouzek value equal to 1.

6 Claims, 4 Drawing Sheets

THRUST RING FOR UNDERCARRIAGE IN A TRACK-TYPE MACHINE

CROSS REFERENCE TO RELATED APPLICATIONS

This Application claims the benefit of the filing date of U.S. Provisional Patent Application Ser. No. 61/361,095, filed Jul. 2, 2010.

TECHNICAL FIELD

The present disclosure relates generally to thrust rings and the like for reacting axial thrust loads between machinery components, and relates more particularly to a thrust ring having oil grooves shaped to balance an oil flow property with a thrust ring strength property.

BACKGROUND

Thrust rings are commonly used to carry thrust loads between rotating parts in a wide variety of types of machinery. Many different types of lubrication strategies for thrust rings and associated components are also well known and have been used in connection with thrust rings for well over a century. Grease, lubricating oils, and even solid materials such as graphite and adherent polypropylene stickers are used to lubricate surfaces of thrust rings and the metallic components with which they may come in contact. Insufficient lubrication can cause all manner of problems, among them galling, fretting and even cracking of certain components. These and other wear-related processes can, over time, deform components or remove sufficient material that specified tolerances of and among the machinery components are compromised. While some "break-in" is expected and even desirable in most thrust ring systems, where wear exceeds some threshold, operation of the associated system can be compromised or fail altogether. Changes in component tolerance and geometry can also negatively impact the capability of a thrust ring system to continue to be lubricated as intended. In other words, since a given lubrication strategy may rely upon specified dimensions, tolerances and even surface characteristics of rotating parts, excessive wear or other material changes can compromise an overall lubrication strategy and hasten failure of the system.

Ground engaging track used in tracked machines is one environment where thrust rings have been used to react axial loads for many years. In a conventional system, thrust rings are placed between adjacent track links to react axial loads, or loads having an axial component, through the track. Construction, mining, earth moving, and a variety of other activities can require profoundly robust thrust rings and other track components. Preservation of sufficient lubrication between and among the track components for an entirety of a track service life, or field duty cycle between planned service intervals, can also be critical. The negative impact of downtime due to unscheduled maintenance or repair for many tracked machines needs no further explanation.

One known thrust ring for machine track commonly used in track-type tractors includes an annular body having relatively small grooves on each axial side of the annular body. This known design includes two grooves on each axial side positioned at 180° from one another. The grooves on each axial side are positioned at the same circumferential location about a center axis of the thrust ring as are the grooves on the opposite axial side. The purpose of the grooves is to provide a path for oil contained within an oil reservoir of the track to pass between an inside of the thrust ring and an outside of the thrust ring, and also flow onto the thrust surfaces which are on each axial side of the thrust ring and contact adjacent components of the track such as a track link or cartridge pin collar. Thrust rings of this general type have been used for many years. It has been discovered that lubricant may fail to enter the interfaces between the thrust ring and abutting components leading to accelerated wear and premature failure. It is believed that the invention disclosed herein overcomes this problem by facilitating the entry of lubricant into these interfaces while balancing the need for structural strength in the load ring.

SUMMARY

In one aspect, a thrust ring for an undercarriage in a track-type machine includes an annular body having an outer circular edge and an inner circular edge defining a common center axis. The annular body further includes a first thrust surface on a first axial side of the annular body and a second thrust surface on a second axial side of the annular body. The first thrust surface includes a first set of oil grooves formed therein at spaced apart locations about the center axis, and a first set of thrust faces positioned in an alternating arrangement with the first set of oil grooves. The second thrust surface includes a second set of oil grooves formed therein and positioned at spaced apart locations about the center axis which are offset from locations of the first set of oil grooves, and a second set of thrust faces positioned in an alternating arrangement with the second set of oil grooves. Each of the oil grooves extends from the inner circular edge to the outer circular edge and defines a throat area for supplying lubricating oil to the thrust faces on the corresponding axial side of the annular body. Each of the thrust faces extends from the inner circular edge to the outer circular edge and defines a face loading area for reacting face loads through the thrust ring. The thrust ring defines a Plouzek value equal to 1.

In another aspect, a thrust ring for an undercarriage in a track-type machine includes an annular body having an outer circular edge and an inner circular edge defining a common center axis. The annular body further includes a first thrust surface on a first axial side of the annular body, and a second thrust surface on a second axial side of the annular body. The first thrust surface includes a first set of thrust faces, and the second thrust surface includes a second set of thrust faces. Each of the first thrust surface and the second thrust surface further includes a set of oil grooves formed therein at spaced apart locations about the center axis and in an alternating arrangement with the corresponding set of thrust faces. Each of the oil grooves extends from the inner circular edge to the outer circular edge and defines a throat area for supplying lubricating oil to the thrust faces on the corresponding axial side of the thrust ring. Each of the oil grooves defines a longitudinal groove axis and has a cross sectional contour extending from a first adjacent thrust face to a second adjacent thrust face. The cross sectional contour is shaped to balance an oil flow property of the thrust ring with a strength property of the thrust ring and defines a non-uniform curve within a plane oriented parallel to the center axis of the thrust ring and normal to the longitudinal groove axis. The curve includes a first and a second lip curve segment each defining a convex radius of curvature and including a maximum point of the curve. The curve further includes a first and a second transition curve segment each adjoining one of the first and second lip curve segments and defining a first concave radius of curvature, and a basal curve segment defining a second concave radius of curvature which is greater than the first concave radius of curvature and including a minimum point of the curve.

In still another aspect, a method of making a thrust ring for an undercarriage in a track-type machine includes forming a plurality of thrust faces on each of a first axial side and a second axial side of an annular thrust ring body, the annular thrust ring body having an inner circular edge and an outer circular edge defining a common center axis. The method further includes forming a plurality of oil grooves on each of the first axial side and the second axial side, the oil grooves having an alternating arrangement with the thrust faces on the corresponding axial side. Forming the plurality of oil grooves further includes balancing an oil flow property of the thrust ring with a strength property of the thrust ring at least in part by shaping a groove surface of each of the oil grooves according to a non-uniform curve between a first adjacent thrust face and a second adjacent thrust face. The non-uniform curve includes a first and a second lip curve segment each having a first radial attribute, a first and a second transition curve segment each adjoining one of the lip curve segments and each having a second radial attribute, and a basal curve segment having a third radial attribute.

DETAILED DESCRIPTION

Figure 1:
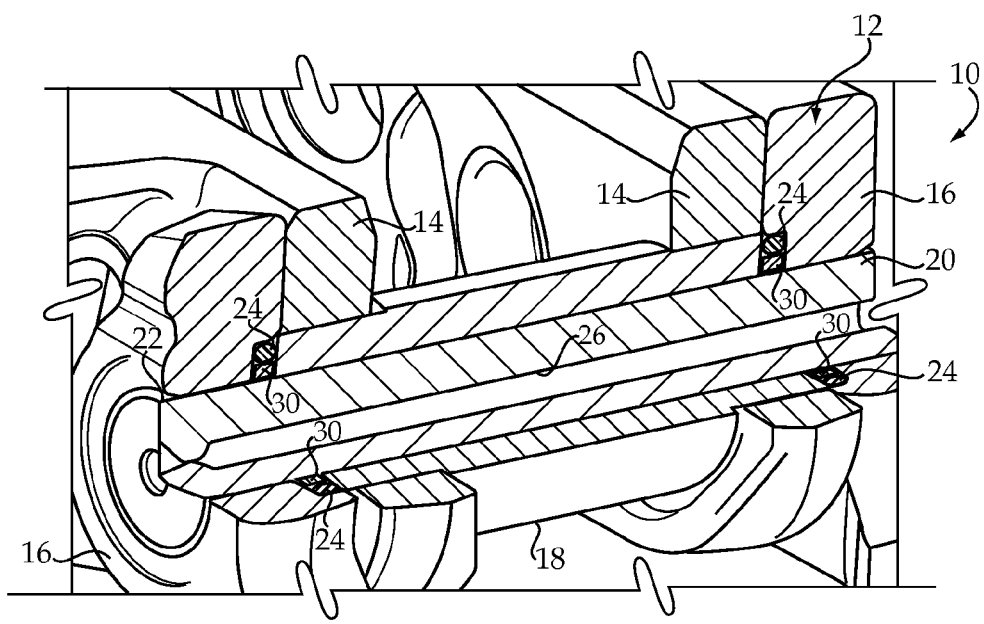
FIG. 1 is a partially sectioned diagrammatic view of a portion of an undercarriage for a track-type machine.

Referring to FIG. 1, there is shown a portion of an undercarriage 10 for a track-type machine. Undercarriage 10 may include a track segment 12 having a plurality of track links, including inboard links 14 and outboard links 16. Inboard links 14 and outboard links 16 may be coupled together with a plurality of additional inboard and outboard links (not shown), to form an endless chain extending about a conventional drive mechanism including one or more track idlers and a drive sprocket. Undercarriage 10 may be used in a variety of track-type machines, such as a track-type tractor, tracked excavator, tracked loader, or the like. Track shoes may be coupled with track segments 12 in a conventional manner to enable the use of undercarriage 10 as a ground engaging propulsion mechanism for the associated track-type machine. As will be further apparent from the following description, one practical implementation of the teachings set forth herein is contemplated to be in track-type tractors used in particularly harsh field conditions, such as mines and landfills.

Figure 2:
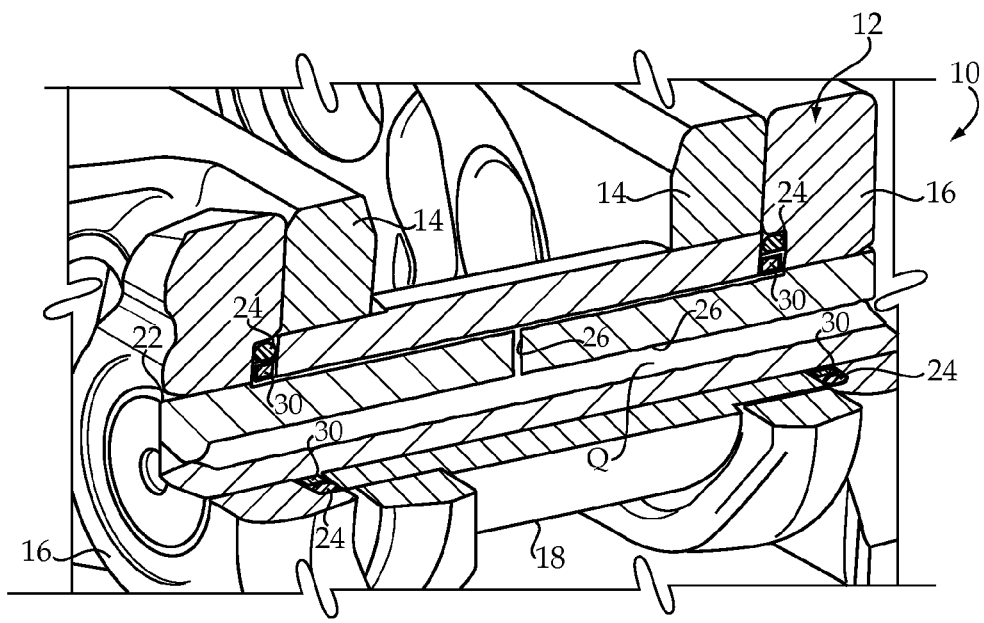
FIG. 2 is a partially sectioned diagrammatic view of a portion of an undercarriage for a track type machine, similar to FIG. 1.

Track segment 12 may further include a bushing 18 which is press fit with inboard links 14, and positioned about a track pin 20. Track pin 20 may be press fit with outboard links 16. In one embodiment, retention rings 22 or some other mechanism for positive pin retention may be coupled with pin 20 to enhance the strength of the coupling with outboard links 16. In the embodiment shown, inboard links 14 and outboard links 16 include S-shaped links, however the present disclosure is not limited in this regard and straight link track might also be used. During operation, one or more track idlers and a drive sprocket may engage with bushing 18 to guide and provide power to the track in a conventional manner. As will be familiar to those skilled in the art, some means for lubricating surfaces which move against one another within track segment 12 may be desirable. To this end, pin 20 may include an oil passage 26 which serves as an oil reservoir for supplying oil to desired locations within track segment 12. During track assembly at the factory or during track repair or servicing, lubricating oil may be supplied into passage 26, and oil passage 26 plugged to seal the lubricating oil therein. Referring also to FIG. 2, there is shown track segment 12 as it might appear having a lubricating oil Q residing in passage 26, and having flowed between and among other components of track segment 12 to create an oil film between various surfaces of the components. A set of seals 24 may also be provided, which fluidly seal between outboard links 16 and bushing 18 to retain oil Q within track segment 12.

Track segment 12 also includes a set of thrust rings 30, each positioned between bushing 18 and one of outboard links 16. Thrust rings 16 can react thrust loads through track segment 12, and may be configured to prevent compressive forces on seals 24 which can otherwise impart a tendency for seals 24 to fail. As further described herein, each of thrust rings 30 may be uniquely configured to provide a robust mechanism for reacting thrust loads, but also facilitate the transfer into and maintaining of oil Q within a region of track segment 12 defined between bushing 18 and outboard links 16, and also between each seal 24 and pin 20.

Figure 3:
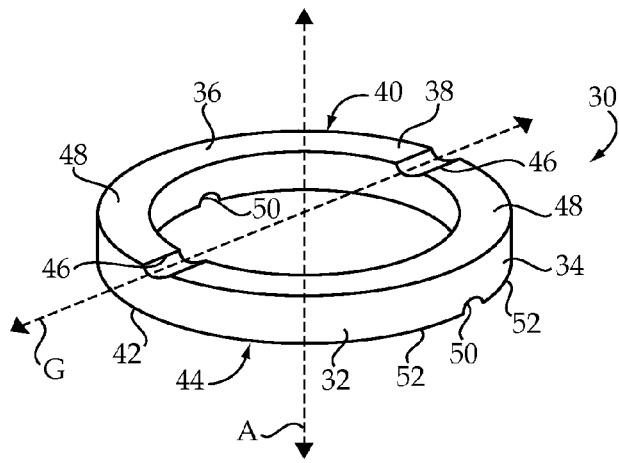
FIG. 3 is an isometric view of a thrust ring for an undercarriage in a track-type machine, according to one embodiment.

Turning now to FIG. 3, there is shown thrust ring 30 in an isometric view. Thrust ring 30 may include an annular body 32 having an outer circular edge 34 and an inner circular edge 36 defining a common center axis A. Annular body 32 may further include a first thrust surface 38 on a first axial side 40, and a second thrust surface 42 on a second axial side 44. First thrust surface 38 may include a first set of oil grooves 46 formed therein at spaced apart groove locations about center axis A. First thrust surface 38 may further include a first set of thrust faces 48 positioned in an alternating arrangement on the corresponding axial side 40 with oil grooves 46. Second thrust surface 42 may include a second set of oil grooves 50 formed therein and positioned at spaced apart groove locations about center axis A, and in an alternating arrangement with a second set of thrust faces 52, on corresponding axial side 44. In one embodiment, oil grooves 46 may include a total of two oil grooves which are positioned about 180° from one another about center axis A. Oil grooves 50 may also include a total of two oil grooves and may be positioned about 180° from one another about center axis A. Oil grooves 46 may each be offset from oil grooves 50, and positioned for example about 90° from each of oil grooves 50 about center axis A. A total of two oil grooves of each set, and a total of two thrust faces of each set, and the described spaced apart and relative angular positions are one practical implementation strategy. In other embodiments, a number of oil grooves of each set might be greater than two, the respective oil grooves of each set might be spaced from one another a distance which is different from 180°, and the offset between oil grooves 46 and oil grooves 50 might be different from 90°.

Each of oil grooves 46 and 50 may extend from inner circular edge 36 to outer circular edge 34 and may define a throat area as further described herein for supplying lubricating oil between inner circular edge 36 and outer circular edge 34, and to thrust faces 48, 52, respectively, on the corresponding axial side 40, 44. Each of thrust faces 48 and 52 may also extend from inner circular edge 36 to outer circular edge 34, and define a face loading area for reacting face loads through thrust ring 30, as further described herein.

Also shown in FIG. 3 is a longitudinal groove axis G which is oriented normal to and intersects center axis A. Each of oil grooves 46 and 50 may be understood to define a similar longitudinal groove axis, however all of the groove axes are not shown in FIG. 3 for purposes of simplicity. Each of oil grooves 46 and 50 may include a uniform longitudinal contour extending from inner circular edge 36 to outer circular edge 34. The uniform longitudinal contour may be understood as a shape profile which is uniform in a first plane which includes a plane of the center axis A. Thus, a projection of the longitudinal groove contour in the first plane may define a linear profile. Each of oil grooves 46 and 50 may include a non-uniform cross sectional contour extending from a first adjacent thrust face to a second adjacent thrust face. For oil groove 46, whose longitudinal groove axis G is illustrated in FIG. 3, the first adjacent thrust face and the second adjacent thrust face are each denoted via reference numeral 48. The non-uniform cross sectional contour may be understood to lie in a second plane which is normal to the first plane and is parallel center axis A. Accordingly, a plane which is normal to and intersects longitudinal groove axis G, and is also parallel to center axis A may be understood as the second plane. Thus, a projection of the cross sectional groove contour in the second plane may define a non-linear, curving profile. The non-uniform cross sectional contour may be shaped in a unique manner to balance one or more oil flow properties of thrust ring 30 with one or more strength properties of thrust ring 30, as further described herein.

Figure 4:
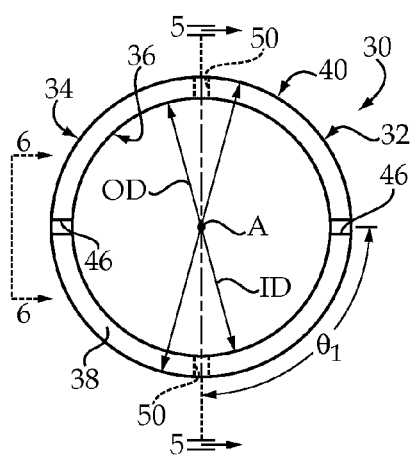
FIG. 4 is an elevational view of the thrust ring of FIG. 3.

Referring now to FIG. 4, there is shown an elevational view of thrust ring 30, and in particular depicting annular body 32 as it might appear when viewed along center axis A. An angle $\theta_1$ defined by a spacing between center axes of one of oil grooves 46 and one of oil grooves 50 in the plane of the page may be equal to about 90°. Also shown in FIG. 4 is an inner diameter dimension "ID" which intersects center axis A and extends between opposite sides of inner circular edge 36. The ID of thrust ring 30 may be equal to about 70 millimeters. An outer diameter dimension "OD" also is shown, which intersects center axis A and extends between opposite sides of outer circular edge 34. The OD of thrust ring 30 may be equal to about 80 millimeters. In one further embodiment, the ID may be equal to about 67.0 millimeters, and the OD may be equal to about 79.0 millimeters. One example embodiment includes an ID equal to about 67.28 millimeters plus or minus a tolerance of 0.18 millimeters, and an OD equal to about 79.33 millimeters plus or minus a tolerance of 0.18 millimeters. As used herein, the term "about" may be understood in the context of a number of significant digits. Thus, about 70 millimeters may be understood to mean between 65 millimeters and 74 millimeters. About 67.0 millimeters may be understood to mean between 66.5 millimeters and 67.4 millimeters, and so on.

Figure 5:
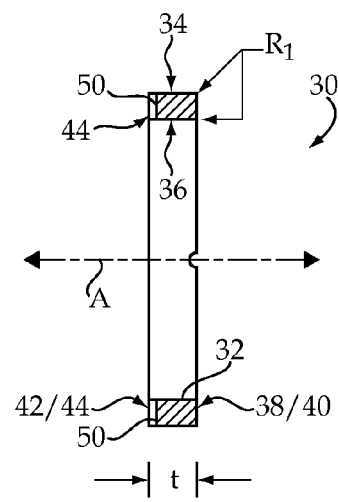
FIG. 5 is a sectioned view taken along line 5-5 of FIG. 4.

Referring to FIG. 5, there is shown a sectioned view taken along line 5-5 of FIG. 4. Among other features, FIG. 5 illustrates an axial thickness "t" of annular body 32 between first axial side 40 and second axial side 44. In particular, axial thickness t may be defined as a thickness of annular body 32 between a plane defined by coplanar thrust faces 48 of thrust surface 38 and another plane defined by coplanar thrust faces 52 of second thrust surface 42, in a direction which is parallel to center axis A. Axial thickness t may be equal to about 11 millimeters in one embodiment. Axial thickness t may be equal to about 11.1 millimeters in one further embodiment, plus or minus tolerance of 0.08 millimeters. FIG. 5 further illustrates radiuses each labeled $R_1$ which are defined by an intersection of thrust surface 38 with inner circular edge 36, and similarly defined by an intersection of thrust surface 38 with outer circular edge 34. Each radius $R_1$ may be equal to a maximum of about 0.13 millimeters. A similar sized radius may be associated with each of the intersections of thrust surface 42 with inner circular edge 36 and with outer circular edge 34.

Figure 6:
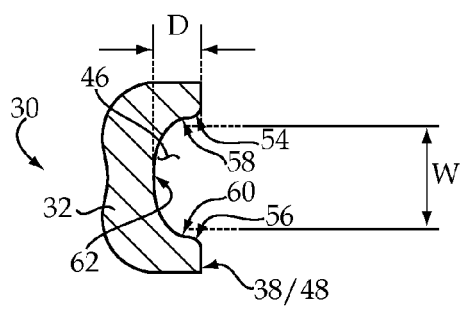
FIG. 6 is a sectioned view taken along line 6-6 of FIG. 4.

Referring now to FIG. 6, there is shown a sectioned view taken along line 6-6 of FIG. 4. FIG. 6 illustrates further features of an oil groove 46, which features may be common to each of oil grooves 46 and 50. Oil groove 46 may include a plurality of different groove surfaces which each include a different radial attribute, as further described herein. The plurality of groove surfaces may include a first lip surface 54 and a second lip surface 56 adjoining a first adjacent thrust face 48 and a second adjacent thrust face 48, respectively. The plurality of groove surfaces may further include a first transition surface 58 and a second transition surface 60 adjoining first lip surface 54 and second lip surface 56, respectively. The plurality of groove surfaces may further include a basal surface 62 adjoining each of first transition surface 58 and second transition surface 60. Each of lip surfaces 54 and 56 may define a convex radius of curvature, corresponding to a first radial attribute. Each of transition surfaces 58 and 60 may define a first concave radius of curvature corresponding to a second radial attribute, whereas basal surface 62 may define a second concave radius of curvature corresponding to a third radial attribute. The second concave radius of curvature may be greater than the first concave radius of curvature and greater than the convex radius of curvature, for reasons which will be apparent from the following description. The convex radius of curvature defined by each of lip surfaces 54 and 56 may be equal to about 0.3 millimeters, plus or minus a tolerance of 0.05 millimeters. The first concave radius of curvature defined by first and second transition surfaces 58 and 60 may be equal to about 0.15 millimeters, plus or minus a tolerance of 0.1 millimeters, and the second concave radius of curvature defined by basal surface 62 may be equal to about 2.0 millimeters plus or minus a tolerance of 0.25 millimeters. Also shown in FIG. 6 is a groove depth dimension D which is defined as the line segment connecting a minimum point of groove 46 in an axial direction with a maximum point of groove 46 in an axial direction. In other words, the groove depth D may be understood as a linear distance between the "bottom" of groove 46, a point on basal surface 62 half way between thrust faces 48, and a "top" of groove 46, a point in space half way between thrust faces 48 and within the plane defined by thrust faces 48. Groove depth D may be equal to or greater than about 10% of axial thickness t. In one embodiment, groove depth D may be equal to about 1.3 millimeters. Groove depth D may also be equal to about 1.25 millimeters plus or minus a tolerance of 0.1 millimeters. Prior thrust rings of the type discussed above are known to have relatively shallower oil grooves, such as a groove depth of about 0.75 millimeters for a thrust ring axial thickness of about 11 millimeters. Groove 46 may also include a groove width W which is equal to between about 200% of groove depth D and about 220% of groove depth D. Groove width W may further be equal to about 2.7 millimeters, and in one further embodiment may be equal to about 2.73 millimeters. Distances from groove width W to thrust faces 48 may be about 0.3 millimeters on each side of groove 46. Groove width W may be understood as a linear dimension between centers of each of the two circles defined by the concave radiuses of transition surfaces 58 and 60.

Figure 7:
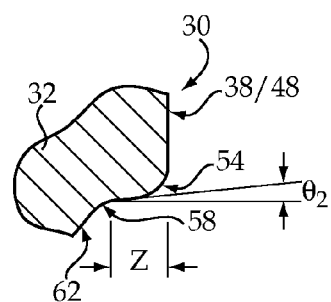
FIG. 7 is a detail view of a portion of FIG. 6.

Referring now to FIG. 7, there is shown a detailed view of a portion of FIG. 6. FIG. 7 illustrates further geometric attributes of thrust ring 30, in particular an angle $\theta_2$ which corresponds to an angle in the plane of the page between the groove surface of groove 46 and the center axis A. The portion of the subject groove surface which defines angle $\theta_2$ may correspond to a planar surface segment where transition surface 58 adjoins lip surface 54. Angle $\theta_2$ may be equal to about 6° plus or minus a tolerance of 1°, and can assist in enabling release of thrust ring body 32 from a mold die, as further described herein. Also shown in FIG. 6 is another groove depth dimension Z which is defined by a line segment connecting a point at the center of the circle defined by the radius of transition surface 58 with another point within the plane of thrust face 48, in a direction parallel center axis A. Depth dimension Z may be equal to about 0.5 millimeters plus or minus a tolerance of 0.1 millimeters.

Figure 8:
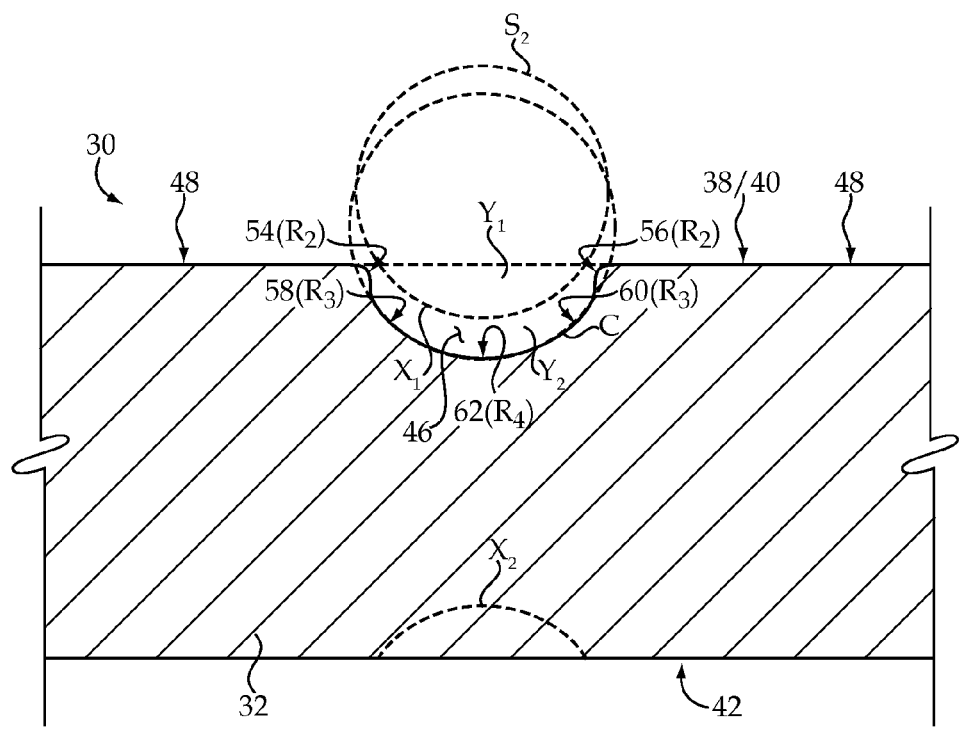
FIG. 8 is a pictorial view illustrating a surface contour of a thrust ring according to one embodiment.

Referring now to FIG. 8, there is shown an enlarged sectioned view of annular body 32 similar to the sectioned view shown in FIG. 6. FIG. 8 further illustrates certain geometric features of groove 46 in comparison to geometric features of a known thrust ring for an undercarriage in a track-type machine, as further described herein. It will be recalled that basal surface 62 may define a concave radius, denoted as $R_4$. Basal surface 62 may also define a circle, shown via reference letter $S_1$. A plurality of surface points of each of transition surfaces 58 and 60, and also a plurality of surface points of each of first lip surface 54 and second lip surface 56 may be within circle $S_1$. In FIG. 8, a first phantom line $X_1$ is shown which depicts a cross sectional contour associated with an oil groove in the known design for a thrust ring specifically discussed above. The cross sectional contour of the known oil groove defines another circle $S_2$ which does not include surface points of a lip surface or transition surface associated therewith. Moreover, the known oil groove would not be said to include separate lip surfaces and transition surfaces at all. Also shown in FIG. 8 is a second phantom line $X_2$ which depicts an approximate location of a second oil groove used in the subject known thrust ring design. It may be noted that the oil groove illustrated via line $X_1$ and the oil groove illustrated via line $X_2$ would be opposite one another within the corresponding known annular thrust ring body, and at identical circumferential locations about its center axis. FIG. 8 further illustrates a difference in throat area between an oil groove in the known design versus that of the present disclosure. In particular, it may be noted that throat area $Y_2$ defined by oil groove 46 is larger, and may be at least twice as large, as a throat area $Y_1$ defined by the oil groove of the known thrust ring.

As alluded to above, the cross sectional contour of each of oil grooves 46 and 50 may be uniquely shaped to balance an oil flow property of thrust ring 30 with a strength property of thrust ring 30. In one embodiment, oil groove 46, as well as the other oil grooves of thrust ring 30, may define a non-uniform curve within a plane oriented parallel to center axis A and normal to longitudinal groove axis G. The non-uniform curve may be understood to lie in the second plane described above in connection with FIG. 3, and corresponds to the plane of the page in FIG. 8. Reference letter C is used in FIG. 8 to illustrate the subject non-uniform curve, which may include an entirety of thrust surface 38 which is not a part of one of thrust faces 48 in FIG. 8. In other words, the non-uniform curve may be understood to correspond to and be defined by the portions of surface 38 which curve inwardly from the plane shared by thrust faces 48. Curve C may include a first and a second lip curve segment which are defined by lip surfaces 54 and 56. Each of the lip curve segments may define a convex radius of curvature $R_2$, and include a maximum point of curve C. Curve C may further include a first and a second transition curve segment defined by transition surfaces 58 and 60. Each of the transition curve segments adjoins one of the first and second lip curve segments and defines the first concave radius of curvature mentioned above and shown in FIG. 8 via reference letter $R_3$. Further, curve C may include a basal curve segment defined by basal surface 62 and including a minimum point of curve C and defining the second concave radius of curvature, illustrated in FIG. 8 via reference letter $R_4$.

The foregoing description includes one practical thrust ring implementation strategy. The principles discussed herein, however, are expected to scale and thus be applicable to thrust rings having a range of sizes. Thrust rings having sizes and dimensions different from those discussed above may be used in tracked machines which are larger or smaller than those contemplated for use with thrust ring 30, for example, and/or having different track configurations. In one example alternative embodiment, a thrust ring includes a geometry very similar to that of thrust ring 30, apart from different dimensions. In particular, this alternative embodiment may include a thrust ring having an annular body with an inner diameter dimension equal to about 48 millimeters, and an outer diameter dimension equal to about 57 millimeters. An axial thickness in the alternative embodiment, defined analogously to that described above, may be equal to about 10.7 millimeters. The convex radiuses of curvature defined by lip surfaces in the alternative embodiment may be equal to about 0.38 millimeters, and the concave radiuses of curvature defined by the transition surfaces may be equal to about 0.2 millimeters. Groove width in the alternative embodiment may be equal to about 3.19 millimeters, and a distance from the groove width to adjacent thrust faces, defined analogously to thrust ring 30, may be equal to about 0.2 millimeters on each side of the corresponding groove. In the alternative embodiment, dimensions and features not specifically listed herein may be the same as analogous features of thrust ring 30. Still other thrust ring embodiments within the scope of the present disclosure are contemplated, having geometric relationships among the various features which are scaled relative to the embodiments described herein, based at least in part on a size of the thrust ring.

INDUSTRIAL APPLICABILITY

In the past, existing thrust ring designs were often assumed to be capable of both handling thrust loads and supplying lubricating oil to associated thrust surfaces in an acceptable manner. The prior thrust ring design discussed above utilized two relatively small oil grooves positioned about 180° apart, on each side of the thrust ring body. It was common for oil grooves on one side of the thrust ring body to be positioned directly opposite oil grooves on the opposite side of the thrust ring body. In some instances, these prior thrust rings acceptably perform their basic functions of carrying axial thrust loads and creating space for seals between track components. It has recently been discovered based on field observations, however, that these known thrust rings may not always perform as desired. The operating environment of thrust rings used in undercarriages for track-type machines may be extremely harsh. Axial thrust loads carried by the thrust rings may be as high as 200,000 lbs. Coupled with the repetitive back and forth rotation of moving parts such as the track links and bushing against thrust rings for a field duty cycle which may be thousands of hours, the extreme durability requirements placed on thrust rings are readily apparent.

Machine track is periodically taken apart for servicing. Track servicing typically entails taking apart each of the segments of the machine track, for example by pressing the track pins out of the links and shearing off the retaining rings, cleaning, turning, and replacing components as needed. It is common for the track seals to be replaced each time a given machine track is serviced. The track seals typically maintain liquid lubricating oil, in some instances under pressure, in and among the various track components as described above. Apart from the track seals, which are commonly replaced, it is generally desirable to reuse many of the track components. Technicians have discovered, however, that an unexpected and undesired amount of wear may occur on the track links or other components based on interaction between the components and thrust rings having known designs. In particular, it has been noted that known thrust rings may have a tendency to wear into a thrust face of an adjacent track link or cartridge pin collar. This phenomenon is known as "track link counterbore wear," and can create space(s) within the track which allow components to move relative to one another in an unintended manner. It is generally desirable for the axial positioning of track components to be maintained within relatively tight tolerances during field operation of the track. Where track components can move relative to one another in an undesired manner, for instance in an axial direction relative to the corresponding track pin, the track seals may begin to leak. Leaking seals may tend to result in a loss of lubricating oil, and eventually excessive wear or failure of the track or individual components thereof. In addition to noting excessive wear between thrust rings and track links upon scheduled servicing, such wear may become apparent when the track seals fail in the field. Seal failure and loss of lubricating oil can cause the track to overheat, and smoke from burning lubricating oil or even steam from mud adhered to the track may be visible.

Thrust rings of the type used in track-type machines are typically made of relatively hard material. Accordingly, a loss of lubricating oil can result in the thrust ring wearing its way into adjacent track components and causing the problems described above. It is believed that existing thrust rings do not adequately provide for the supply of oil onto thrust faces of the thrust ring, and thus rubbing of the hardened thrust ring material against adjacent track components with little or no lubricating oil film eventually wears away enough material to increase axial end play within the track until the track seals themselves begin to be subjected to substantial thrust loads. Under such conditions, the track seals may eventually fail. The present disclosure addresses these concerns by teaching a design for thrust ring 30 which is expected to provide superior oil flow properties to thrust faces of the thrust ring without sacrificing strength. This is achieved at least in part by shaping each of oil grooves 46 and 50 according to the non-uniform curve described herein, and by selecting appropriate materials and manufacturing techniques for thrust ring 30.

Annular body 32 may be formed from steel, and in one embodiment may include pressed powdered steel having a density between about 6900 and 7000 kilograms per cubic meter. Thrust ring 30 may be made by pouring powdered metal into a mold, and then pressing the powdered metal into a desired shape which includes basic features of annual body 32, such as inner circular edge 36, outer circular edge 34, first thrust surface 40, second thrust surface 42. Oil grooves 46 and 50 may also be formed during the powder metal pressing process. Specific features such as the different groove surfaces and their radial attributes may be largely or entirely formed during the powder metal pressing process, however such features may also be shaped or tailored to final form via conventional machining techniques of annular body 32 after it is removed from a mold. Thus, as used herein the term "radial attribute" may refer, for example to length, size, and convexity/concavity of radiuses in a final form on a thrust ring ready to be placed in service, but may also be understood to refer to rougher, not yet finished features, whose different radial attributes are observable even if length and/or size of a radius are not readily measurable.

After forming annular body 32 from pressed powdered metal, flash resulting from the pressing process may be removed by vibratory deburring in ceramic media on both axial sides of annular body 32. A conventional machining process may then be used to provide a desired surface finish and surface geometry of annular body 32. Annular body 32 may then be tempered at about 250°, plus or minus 10°, for about 60 minutes, for example. This tempering process is typically not used with known thrust rings, and is believed to additionally soften hard particles within the material matrix of annular body 32 to enhance strength. In addition, annular body 32 may be oil impregnated by a suitable vacuum method, wherein annular body 32 is placed in a vacuum environment which is then filled with lubricating oil. The lubricating oil may effectively be sucked into pores in the material matrix of annular body 32. The oil impregnated thrust ring may then be packaged in non-absorptive packaging, and shipped for retrofitting into existing tracks, or used for assembly of new tracks.

As discussed above, forming oil grooves 46 and 50 may include balancing an oil flow property of the thrust ring 30 against a strength property of thrust ring 30. In general terms, the greater a throat area of each of oil grooves 46 and 50, the better the oil grooves can be expected to perform in supplying oil between inner circular edge 36 and outer circular edge 34, and also in supplying oil to adjacent thrust faces 48 and 42. There are limits, however, on how large the throat area of oil grooves 46 and 50 can be without compromising strength of annular body 32 and thus its ability to handle axial thrust loads.

Returning to FIG. 8, the balancing of these various concerns may be understood by visualizing how the shape of groove 46 depicted therein would change by varying certain factors. It will be recalled that basal surface 62 defines a concave radius of curvature $R_4$. If radius $R_4$ is made larger, holding other factors equal, groove 46 may be relatively shallow, and thus have a reduced throat area and an increased axial thickness. On the other hand, if radius $R_4$ is made relatively smaller, basal surface 62 may plunge relatively deeper into annular body 32, in an axial direction, and throat area may be relatively larger but axial thickness will tend to be less. Balancing an oil flow property of thrust ring 30 with a strength property may thus be understood to balance a flow area property which is based on throat area against a ring strength property which is based on axial thickness. The subject flow area property may be negatively correlated with a size of radius $R_4$, whereas the ring strength property may be positively correlated with the size of radius $R_4$.

A size of concave radius of curvature $R_3$ defined by transition surfaces 58 and 60 may also be relevant to balancing oil flow against ring strength. In particular, as radius $R_3$ is made relatively larger, a throat area of groove 46 could be expected to be relatively less, and where radius $R_3$ is made relatively smaller, a throat area of groove 46 may be relatively larger. However, as radius $R_3$ is made relatively large its capacity to diffuse stress within annular body 32 is increased, and where radius $R_3$ is made relatively small its capacity to diffuse stress is decreased. Accordingly, balancing the oil flow property with a strength property may also include balancing a flow area property which is negatively correlated with a size of radius $R_3$ with a stress diffusion property which is positively correlated with the size of radius $R_3$.

The relative size of radius $R_2$ define by lip surfaces 54 and 56 may also be relevant to the balancing oil flow with ring strength. A surface area of thrust faces 48 may be positively correlated with the load handling capability of thrust ring 30. The relationship may be exponential. It is thus desirable to form thrust faces 48 to have as large a surface area as possible. Thus, a surface area of thrust faces 48 may be understood to relate to yet another strength property of thrust ring 30. Where radius $R_2$ is made relatively large, less surface area of thrust faces 48 is available. Where radius $R_2$ is made relatively small, more surface area of thrust faces 48 is available. It has been discovered that the capacity for oil grooves 46 and 50 to supply oil onto adjacent thrust faces relates to the size of radius $R_2$. As radius $R_2$ is made relatively large, it is believed that oil can flow more readily from grooves 46 and 50 to adjacent thrust faces. Where radius $R_2$ is made relatively small, it is believed that the relatively sharp edge can have the effect of inhibiting oil flow onto adjacent thrust faces, for example by wiping away oil film. Accordingly, balancing oil flow with ring strength may also include balancing a flow property positively correlated with a size of radius $R_2$ with a strength property negatively correlated with a size of radius $R_2$.

Based on the considerations disclosed and explained herein with regard to balancing oil flow against ring strength, thrust ring 30 may define a Plouzek value equal to one. A Plouzek value may be equal to either one or zero. Prior art thrust rings not capable of supplying oil to their thrust faces sufficient to avoid track link counterbore wear under field conditions would be said to include a Plouzek value equal to zero, regardless of ring strength. Likewise, prior art thrust rings capable of supplying sufficient oil to thrust faces thereof but having insufficient strength to tolerate the axial loads experienced under field conditions, and thereby breaking or cracking, would also be understood to define a Plouzek value equal to zero.

One means of determining whether a given thrust ring defines a Plouzek value equal to zero or a Plouzek value equal to one may include placing the subject thrust ring within a track of a track-type tractor and operating the track-type tractor under field conditions for a time corresponding to a scheduled track service interval. If track link counterbore wear is observed upon subsequent track disassembly, or seal failure is observed, such as by the detection of smoking oil or steam as described herein, it is likely that the thrust ring defines a Plouzek value equal to zero. If, on the other hand, seal failure does not occur, and track link counterbore wear is not observed when the track is disassembled, it may be determined that the subject thrust ring likely defines a Plouzek value equal to one. Track-type tractors suitable for determining whether a given thrust ring defines a Plouzek value equal to one or equal to zero via field testing include D8, D10 and D11 track type tractors manufactured by the assignee of the present patent application. Example scheduled service intervals and field operating conditions are well known and/or publicly accessible to those skilled in the art.

Figure 9:
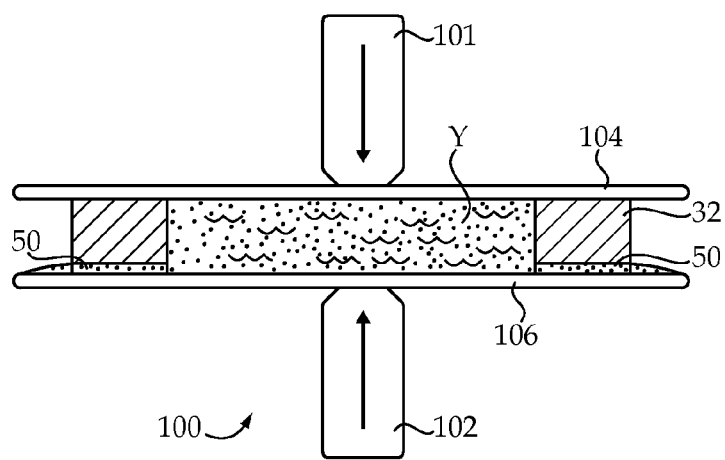
FIG. 9 is a diagrammatic view of a thrust ring test set-up, according to one embodiment.

Another way to determine if a given thrust ring defines a Plouzek value equal to one or a Plouzek value equal to zero includes a laboratory test. Referring to FIG. 9, there is shown a bench test apparatus 100. Apparatus 100 may include a first linear force producing device 101 and a second linear force producing device 102, together comprising a clamping mechanism. Apparatus 100 may further include a first plate 104, and a second plate 106, which each might include transparent panels. A thrust ring annular body, such as annular body 32, may be sandwiched between plates 104 and 106 and devices 101 and 102 to fixture annular body 32 in place vertically between plates 104 and 106. No specified clamping load need be applied so long as plates 104 and 106 are maintained in contact with both sides of annular body 32. A lubricating oil Y may be supplied into a space defined by annular body 32, and by each of plates 104 and 106. One suitable lubricating oil for the test procedure depicted in FIG. 9 includes 80W-90 track oil readily commercially available and suitable for use in the machine track environments contemplated herein. Also shown in FIG. 9 are grooves 50. It may be noted that oil Y has flowed, under the force of gravity, out through grooves 50. It is believed that a surface tension of conventional track oil, of which oil Y is one example, tends to be sufficient to inhibit adequate flow through oil grooves of known thrust rings under conditions similar to that depicted in FIG. 9. This may be due at least in part to the relatively small size of oil grooves in known thrust rings. A related issue with regard to known thrust rings is the tendency for their oil grooves to be insufficiently sized and/or shaped to enable oil flow from the oil grooves onto adjacent thrust surfaces. Placing a thrust ring annual body within apparatus 100 as described herein enables visual determination of whether oil flow properties of the given thrust rings are indicative of a Plouzek value equal to one or a Plouzek value equal to zero. For a thrust ring having a Plouzek value equal to zero, it would be expected that oil Y would not flow through grooves 50 and out of thrust ring annular body 32 as shown. It might also be expected that for a thrust ring defining a Plouzek value equal to zero, little or no evidence of oil film transitioning onto thrust faces adjacent to oil grooves 50 would be apparent. The test described above may take place at standard temperature and pressure.

Figure 10:
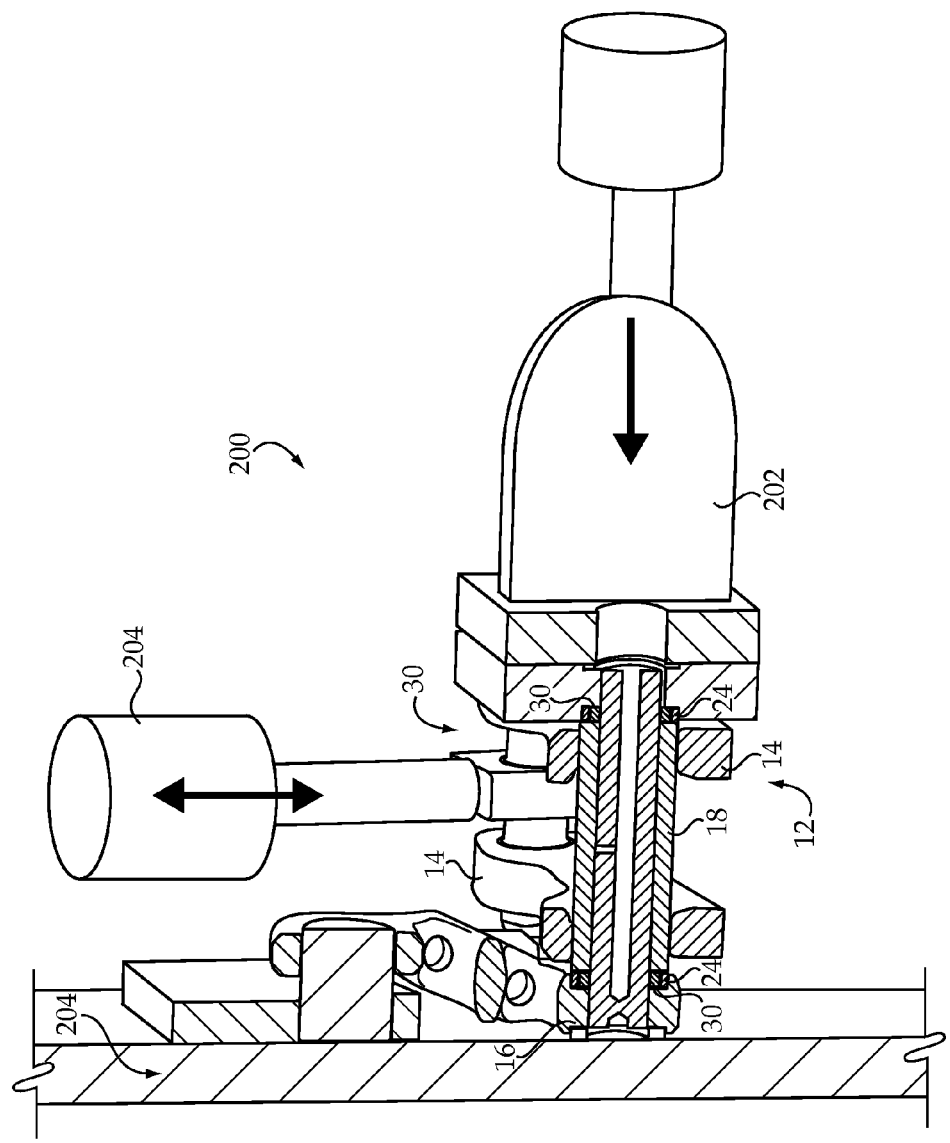
FIG. 10 is a diagrammatic view of a thrust ring test set-up, according to one embodiment.

Turning to FIG. 10, there is shown a test apparatus 200 whereby strength properties of a thrust ring such as thrust ring 30 may be tested via the simulation of loading under field conditions. Apparatus 200 includes a first actuator 202 which can apply a range of axial loads to track segment 12 which are reacted through track segment 12 via thrust rings 30. Track segment 12 may be mounted to a fixture 206, and a second actuator 204 may be coupled with track segment 12 to move links 14 up and down relative to link 16 and thus rotating thrust rings 30 back and forth relative to adjacent track component within a range of rotation of about 12° in either of two directions, for example. By placing track segment 12 in test fixture 200, and operating actuator 202 and 204, a range of loading conditions which are similar to track field conditions may be simulated. After a period of time of operating test fixture 200 in this general manner, such as a portion of a prescribed field service interval or all of a prescribed field service interval for track segment 12, track segment 12 may be disassembled and thrust rings 30 examined, as well as links 14 and 16 and bushing 18. The presence of wear on the track components as described herein such as track link counterbore wear may be indicative of insufficient oil flow provided by thrust rings 30, and thus indicative that the thrust rings define a Plouzek value equal to zero. During or after testing, seals 24 might also be examined, or track segment 12 observed for evidence of seal failure. Examination of the thrust rings could also indicate whether cracking, breaking or other indicia of stress concentration have developed. Where stress concentrations or failure are detected, it may be concluded that the thrust ring likely defines a Plouzek value equal to zero. It will thus be readily apparent that a thrust ring that satisfies the criteria of successful oil flow and ring strength by way of the techniques illustrated and explained with regard to FIGS. 9 and 10 likely defines a Plouzek value equal to one.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A thrust ring for an undercarriage in a track-type machine comprising:
    an annular body including an outer circular edge and an inner circular edge defining a common center axis, the annular body further including a first thrust surface on a first axial side of the annular body and a second thrust surface on a second axial side of the annular body;
    the first thrust surface having a first set of oil grooves formed therein at spaced apart locations about the center axis, and a first set of thrust faces positioned in an alternating arrangement with the first set of oil grooves; and
    the second thrust surface having a second set of oil grooves formed therein and positioned at spaced apart locations about the center axis which are offset from locations of the first set of oil grooves, and a second set of thrust faces positioned in an alternating arrangement with the second set of oil grooves;
    wherein each of the oil grooves extends from the inner circular edge to the outer circular edge and defines a throat area for supplying lubricating oil to the thrust faces on the corresponding axial side of the annular body, and each of the thrust faces extends from the inner circular edge to the outer circular edge and defines a face loading area for reacting face loads through the thrust ring; and
    wherein each of the oil grooves further includes a first lip surface and a second lip surface adjoining a first adjacent thrust face and a second adjacent thrust face, respectively, each of the first lip surface and the second lip surface defining a convex radius of curvature; a first transition surface and a second transition surface adjoining the first lip surface and the second lip surface, respectively, each of the first transition surface and the second transition surface defining a first concave radius of curvature which is less than the convex radius of curvature; and a basal surface adjoining each of the first transition surface and the second transition surface, the basal surface defining a second concave radius of curvature which is greater than the first concave radius of curvature and greater than the convex radius of curvature.

2. The thrust ring of claim 1 wherein each of the oil grooves includes a uniform longitudinal contour extending from the inner circular edge to the outer circular edge, the uniform longitudinal contour lying in a first plane which includes a plane of the center axis, and wherein each of the oil grooves further includes a non-uniform cross sectional contour extending from the first adjacent thrust face to the second adjacent thrust face, the non-uniform cross sectional contour lying in a second plane which is normal to the first plane and parallel the center axis.

3. The thrust ring of claim 1 wherein the first concave radius of curvature is equal to about 0.15 millimeters, and wherein the second concave radius of curvature is equal to about 0.25 millimeters.

4. The thrust ring of claim 1 wherein the second concave radius of curvature defines a circle, the circle including a plurality of surface points of each of the first transition surface and the second transition surface, and a plurality of surface points of each of the first lip surface and the second lip surface.

5. The thrust ring of claim 1 wherein each of the first set of oil grooves and the second set of oil grooves includes a total of two oil grooves, and wherein each of the first set of thrust faces and the second set of thrust faces includes a total of two thrust faces.

6. The thrust ring of claim 5 wherein the oil grooves of the first set are positioned about 180° from one another about the center axis, and wherein the oil grooves of the second set are positioned about 180° from one another about the center axis, and wherein each of the oil grooves of the first set are positioned about 90° from the oil grooves of the second set about the center axis.

\* \* \* \* \*

UNITED STATES PATENT AND TRADEMARK OFFICE
CERTIFICATE OF CORRECTION

| | |
|---|---|
| PATENT NO. | : 8,905,640 B2 |
| APPLICATION NO. | : 13/166859 |
| DATED | : December 9, 2014 |
| INVENTOR(S) | : Snyder et al. |

It is certified that error appears in the above-identified patent and that said Letters Patent is hereby corrected as shown below:

ON THE TITLE PAGE

Column 1, Item 73 (Assignee), line 1, delete "Caterpillar, Inc.," and insert -- Caterpillar Inc., --.

Signed and Sealed this
Seventeenth Day of November, 2015

Michelle K. Lee
*Director of the United States Patent and Trademark Office*